United States Patent Office 3,709,814
Patented Jan. 9, 1973

3,709,814
HYDROFINING-HYDROCRACKING PROCESS USING PALLADIUM-CONTAINING CATALYST
Joseph Jaffe, Berkeley, Calif., assignor to Chevron Research Company, San Francisco, Calif.
Continuation-in-part of application Ser. No. 760,460, Sept. 18, 1968. This application Mar. 6, 1970, Ser. No. 17,127
The portion of the term of the patent subsequent to Oct. 20, 1987, has been disclaimed
Int. Cl. C10g 13/06, 23/02; C01b 33/28
U.S. Cl. 208—59
3 Claims

ABSTRACT OF THE DISCLOSURE

A hydrofining-hydrocracking process which comprises contacting a hydrocarbon feed containing more than 50 parts per million of organic nitrogen and containing substantial amounts of materials boiling above 200° F., said feed being selected from the group consisting of petroleum distillates, solvent-deasphalted petroleum residua, shale oils and coal tar distillates, in a reaction zone with hydrogen and a catalyst, at hydrofining-hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, removing ammonia from the effluent from said reaction zone, and recovering hydrofined and hydrocracked products from said reaction zone, said catalyst comprising:
(A) A gel matrix comprising:
    (a) at least 15 weight percent silica,
    (b) alumina, in an amount providing an alumina-to-silica weight ratio of 15/85 to 80/20,
    (c) nickel or cobalt, or the combination thereof, in the form of metal, oxide, sulfide or any combination thereof, in an amount of 1 to 10 weight percent, based on said matrix, calculated as metal,
    (d) molybdenum or tungsten, or the combination thereof, in the form of metal, oxide, sulfide or any combination thereof, in an amount of 5 to 25 weight percent, based on said matrix, calculated as metal;
(B) A crystalline zeolitic molecular sieve:
    (a) containing from 0.1 to 2.0 weight percent palladium, calculated as metal,
    (b) containing less than 5 weight percent sodium,
    (c) being in particulate form and being dispersed throughout said matrix by cogelation of said matrix around said sieve;
said catalyst composite being further characterized by an average pore diameter below 100 angstroms and a surface area above 200 square meters per gram.

RELATED APPLICATION

This application is a continuation-in-part of copending Joseph Jaffe application Serial No. 760,460, filed Sept. 18, 1968 now abandoned.

INTRODUCTION

This invention relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include:

United States patent _____ 3,140,251
United States patent _____ 3,140,253
British patent _____ 1,056,301
French patent _____ 1,503,063
French patent _____ 1,506,793

There has been a continuing search for further improvements in such catalsyts, particularly for hydrocracking and hydrofining uses. It is known that the results of catalyst modifications often are largely unpredictable, and the increased number of possible modifications in catalysts containing an additional molecular sieve component does not diminish the unpredictability. A significantly improved result in a test with a modified catalyst containng a molecular sieve component and other catalyst components seldom would have been predictable before the test, particularly in hydrocracking and hydrofining applications of such catalysts, and is a much-desired goal.

OBJECTS

In view of the foregoing, objects of the present invention include providing a combination hydrofining-hydrocracking process using an improved catalyst comprising a crystalline zeolitic molecular sieve component associated with other catalyst components that has, compared with similar prior art catalysts:

(1) improved hydrocracking activity; and
(2) improved hydrodenitrification activity, said process being capable of producing high yields of excellent-quality jet fuel and other valuable fuel products from a feedstock containing more than 50 parts per million of organic nitrogen, without the necessity for a prior hydrofining step.

The present invention will best be understood, and further objects and advantages thereof will be apparent, from the following description when read in connection with the accompanying drawing.

DRAWING

Figure 1:
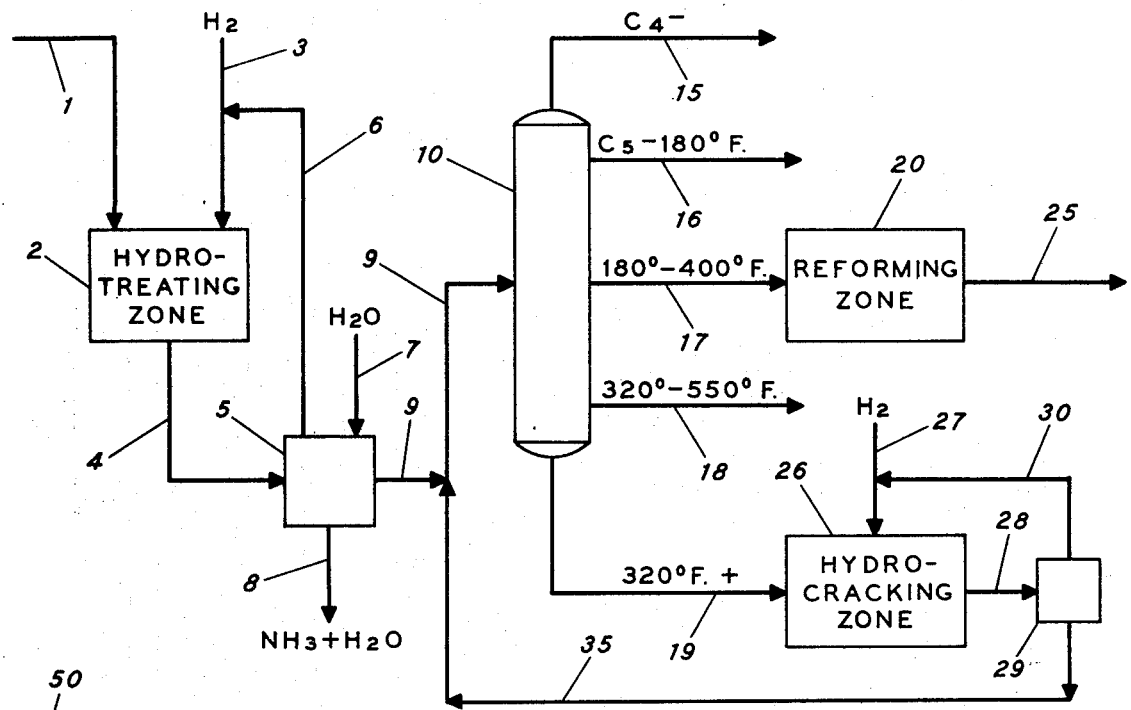

In the drawing, FIG. 1 is a diagrammatic illustration of apparatus and flow paths suitable for carrying out the process of several of the embodiments of the present invention, wherein the process of the present invention is operated on a once-through basis to concurrently hydrocrack and hydrodenitrify a hydrocarbon feedstock to produce more valuable products, some of which may be further upgraded by catalytic reforming or catalytic hydrocracking, if desired.

Figure 2:
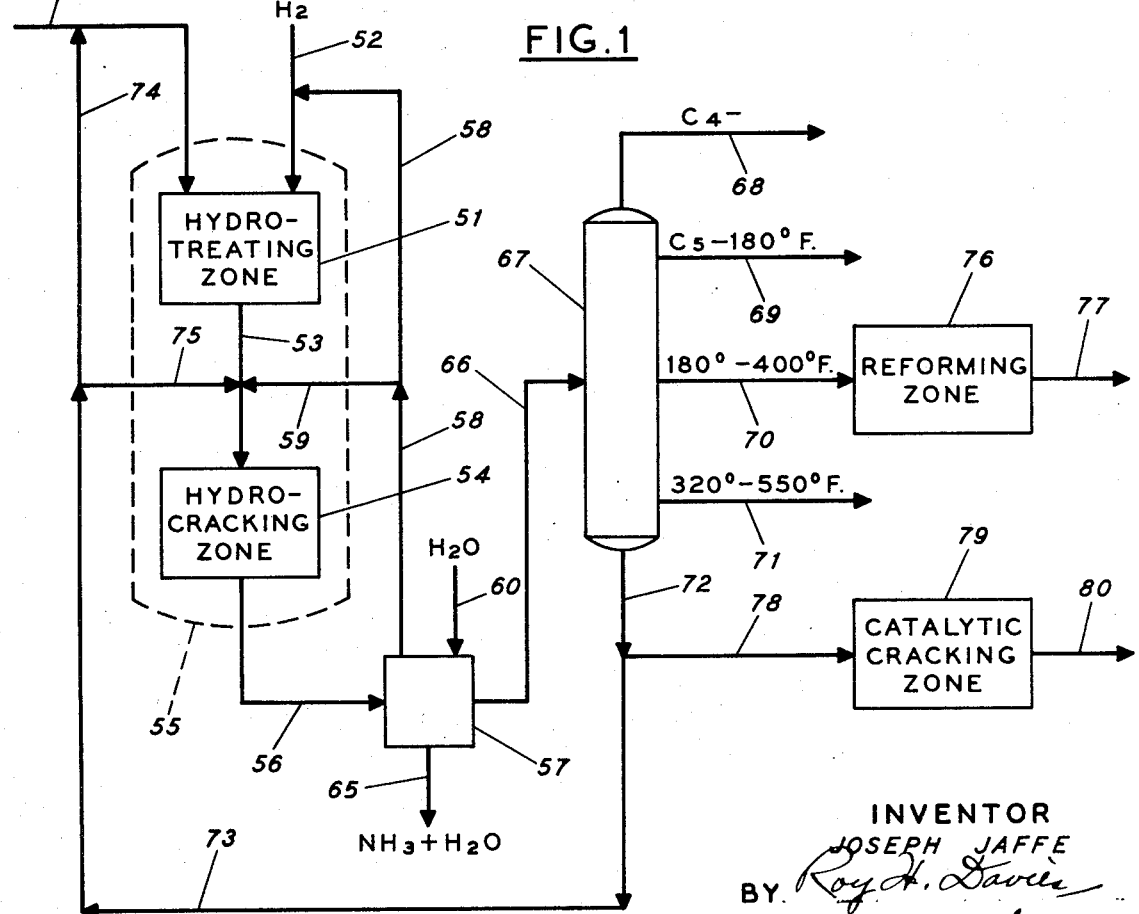

FIG. 2 is a diagrammatic illustration of apparatus and flow paths suitable for carrying out the process of additional embodiments of the present invention, wherein the process of the present invention accomplishes concurrent hydrofining and hydrocracking of a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

STATEMENT OF INVENTION

In accordance with the present invention, it has been found that the foregoing objects are achieved by a process wherein a hydrocarbon feedstock containing more than 50 parts per million organic nitrogen is concurrently hydrofined and hydrocracked by being contacted at particular hydrofining-hydrocracking conditions with hydrogen and a cogelled catalyst containing a unique combination of catalytic components in particular amounts, including silica, alumina, a Group VI component, a Group VIII component, and a crystalline zeolitic molecular sieve component containing 0.1 to 2.0 weight percent palladium, calculated as metal.

More particularly, in acordance with the present invention there is used in said process a cogelled catalyst composite comprising:

(A) A gel matrix comprising:

(a) at least 15 weight percent silica,
(b) alumina, in an amount providing an alumina-to-silica weight ratio of 15/85 to 80/20,
(c) nickel or cobalt, or the combination thereof, in the form of metal, oxide, sulfide or any combination thereof, in an amount of 1 to 10 weight percent, preferably 5 to 9 weight percent, of said matrix, calculated as metal,
(d) molybdenum or tungsten, or the combination thereof, in the form of metal, oxide, sulfide or any combination thereof, in an amount of 5 to 25 weight percent, preferably 10 to 20 weight percent, of said matrix, calculated as metal;

(B) A crystalline zeolitic molecular sieve containing 0.1 to 2.0 weight percent palladium, calculated as metal, said sieve further being in particulate form and being dispersed through said matrix; said catalyst composite being further characterized by an average pore diameter below 100 angstroms and a surface area above 200 square meters per gram.

Preferably said gel matrix comprises nickel and tungsten, in the form of the metals, oxides, sulfides or any combination thereof. Said molecular sieve may be present in an amount of 1 to 50 weight percent of said composite.

Still further in accordance with the present invention, the catalyst used in said process may be a cogelled catalyst consisting essentially of:

(A) A porous xerogel comprising:

(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 1 to 10 weight percent, preferably 5 to 9 weight percent, of said xerogel, calculated as metal,
(d) tungsten, in the form of metal, oxide, sulfide or any combination thereof, in an amount of 5 to 25 weight percent, preefrably 10 to 20 weight percent, of said xerogel, calculated as metal;

(B) A crystalline zeolite molecular sieve in an amount of 1 to 50 weight percent of said catalyst, said sieve containing 0.1 to 2.0 weight percent palladium, calculated as metal, said sieve further being in the form of particles, said particles being dispersed through said xerogel; said catalyst having a pore diameter below 100 angstroms and a surface area above 200 square meters per gram.

Still further in accordance with the present invention, there is provided a hydrofining-hydrocracking process which comprises contacting a hydrocarbon feed containing more than 50, and preferably more than 100, parts per million of organic nitrogen, and containing substantial amounts of materials boiling above 200° F., said feed being selected from the group consisting of petroleum distillates, solvent-deasphalted petroleum residua, shale oils and coal tar distillates, in a reaction zone with hydrogen and the catalyst described above, at hydrofining-hydrocracking conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, removing ammonia from the effluent from said reaction zone, and recovering hydrofined and hydrocracked products from said reaction zone. The hydrocarbon feed may contain the indicated substantial amount of organic nitrogen, because the catalyst used in the process of the present invention is extremely tolerant of organic nitrogen as well as of ammonia, and because the catalyst is an efficient hydrodenitrification catalyst. The catalyst will accomplish hydrodenitrification and hydrocracking concurrently and efficiently. The catalyst may be used as a hydrodenitrification catalyst in a zone preceding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

HYDROCARBON FEEDSTOCKS

The feedstocks supplied to the hydrofining-hydrocracking zone in the process of the present invention are selected from the group consisting of petroleum distillates, solvent-deasphalted petroleum residua, shale oils and coal tar distillates. The feedstocks contain more than 50 parts per million organic nitrogen, and contain substantial amount of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst used in the process of the present invention, the feedstocks need not be subjected to a prior hydrofining treatment before being used in the hydrofining-hydrocracking process of the present invention. Feedstocks may contain as high as several thousand parts per million organic nitrogen, although preferably the organic nitrogen content will be less than 1000 parts per million organic nitrogen. A desirable range for organic introgen is from 50 to 3000 p.p.m., preferably 100 to 2000 p.p.m. Feedstocks also may contain several weight percent organic sulfur.

CATALYST USED IN THE PROCESS OF THE PRESENT INVENTION, COMPRISING A CRYSTALLINE ZEOLITIC MOLECULAR SIEVE COMPONENT, AND PREPARATION THEREOF

(A) General

The crystalline zeolitic molecular sieve component of the hydrofining-hydrocracking catalyst used in the process of the present invention, prior to being loaded with palladium, may be of any type that is known in the art as a useful component of a conventional hydrocracking catalyst containing a crystalline zeolitic molecular sieve component. A decationized molecular sieve cracking component is preferred. Especially suitable are faujasite, particularly Y type and X type faujasite, and mordenite, in the ammonia form, hydrogen form, alkaline earth exchanged form, rare earth-exchanged form or manganese-exchanged form. The sodium content of the molecular sieve component should be less than 5 weight percent, calculated as metal.

An ultra-stable form of crystalline zeolitic molecular sieve also is applicable; that is, one having a sodium content below about 3 weight percent, calculated as $Na_2O$, a unit cell size below 24.65 angstroms, and a silica/alumina weight ratio above about 2.15.

The palladium hydrogenating component may be present in the final catalyst in the form of the metal, metal oxide, metal sulfide or a combination thereof. So long as the crystalline zeolitic molecular sieve component of the catalyst contains, that is, is loaded with, 0.1 to 2.0 weight percent palladium, calculated as metal, additional palladium may be present in the catalyst matrix, but preferably in an amount such that the palladium content of the total catalyst does not exceed 2.0 weight percent, calculated as metal.

The crystalline zeolitic molecular sieve component of the catalyst may contain, in addition to the palladium loading metal, any of the following elements, or compounds, or compounds of any of the following elements, which are effective in modifying the hydrogenation activity of the catalyst: Sn, Sb, As, Cr, Co, Fe, Pb, W, Cu, Ag, Re, S, Zn, Cd, Tl, Mo, V, Se, Ni. The crystalline zeolitic molecular sieve component of the catalyst also may contain, in addition to the palladium loading metal, any polyvalent noncatalytic cation, which will act as a promoter for said molecular sieve component; particularly useful in this respect are Mn, polyvalent noncatalytic rare earths, for example Ce and La, and polyvalent noncatalytic alkaline earths, for example Mg, Ca and Ba.

(B) Method of preparation

The molecular sieve component of the catalyst may be prepared by any conventional method known in the art.

The palladium hydrogenating component may be added to the crystalline zeolitic molecular sieve component of the catalyst by any convenient method, for example impregnation, adsorption or ion exchange. The palladium compound used in loading the molecular sieve component may be any convenient palladium compound, for example palladium chloride or tetra ammino palladium nitrate.

The molecular sieve component may be dispersed in a matrix of the other catalyst components by cogelation of said other components around said molecular sieve component in a conventional manner.

The cogelled catalyst may be washed and dried in a conventional manner. Drying may be accomplished at a temperature in the range 100° to 500° F. for a reasonable time, for Example 2 to 48 hours. Following drying, the catalyst may be activated by subjecting it to a heat treatment at 850° to 1100° F. for 0.5 to 20 hours. Particularly when the catalyst comprises an ultra-stable crystalline zeolitic molecular sieve component, it may be subjected, following drying, to a high-temperature thermactivation, at 1200° to 1600° F. for 0.25 to 48 hours, in an oxygen-containing gas stream, which may be air, and which preferably is as dry as practicable.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrofining-hydrocracking zone in the process of the present invention is operated at a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of hydrocarbon feedstock.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with one embodiment of the present invention, a hydrocarbon feedstock as previously described, which in this case may boil above 400° F. and which contains more than 50 parts per million of organic nitrogen compounds, is passed through line 1 into hydrofining-hydrocracking zone 2, which contains the catalyst of the present invention. The feedstock is hydrocracked in hydrocracking zone 2 at conditions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4$-fraction which is withdrawn through line 15, a $C_5$-180° F. fraction which is withdrawn through line 16, a 180°–400° F. fraction which is withdrawn through line 17, a 320°–550° F. fraction which is withdrawn through line 18, and a 320° F.+fraction which is withdrawn through line 19. The $C_5$-180° F. fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320–550° F.+fraction withdrawn through line 18 is a superior-quality jet fuel. The 320° F.+fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400° F. and which contains more than 50 parts per million of organic nitrogen compounds, is passed through line 50 to hydrofining-hydrocracking zone 51, containing the catalyst of the present invention. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking component, in either of which cases the effluent from zone 51 may be passed through line 53 into zone 54 without intervening impurity removal. If the hydrocracking catalyst in zone 54 does not contain a crystalline zeolitic molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst used in the process of the present invention or a conventional catalyst comprising a crystalline zeolitic molecular sieve component. The effluent from zone 54 is passed through line 56 to separation zone 57, from which hydroyen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4$-fraction which is withdrawn through line 68, a $C_5$-180° F. fraction which is withdrawn through line 69, a 180°–400° F. fraction which is withdrawn through line 70, a 320°–550° F. fraction which is withdrawn through line 71, and a 320° F.+fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The $C_5$-180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the process of the present invention, the catalyst used therein, and the preparation of said catalyst. The examples are not intended to limit the scope of the present invention.

Example 1

A cogelled catalyst (Catalyst A) of the following composition is prepared:

| Component: | Wt. percent of total catalyst |
|---|---|
| NiO | 10.0 |
| $WO_3$ | 24.5 |
| $Al_2O_3$ | 29.0 |
| $SiO_2$ | 25.5 |
| Palladium-loaded crystalline zeolitic molecular sieve, Y form, containing 1.0 weight percent palladium | 11.0 |
| Total | 100.0 |

The catalyst is prepared by the following steps, using sufficient quantities of the various starting materials to produce the above-indicated weight percentages of the components of the final catalyst:

(1) A Linde ammonium Y crystalline zeolitic molecular sieve is introduced into a Hobart kitchen blender, followed by slow addition, while stirring, of an aqueous solution of tetra ammino palladium nitrate $$[Pd(NH_3)_4][NO_3]_2$$

to form a pasty mass. The pasty mass is transferred to a dish, dried at 120° F. for about 16 hours, and then calcined in flowing air for 5 hours at 950° F. The calcined material contains 1.0 weight percent palladium, calculated as metal.

(2) An aqueous acidic solution is prepared, containing $AlCl_3$, $NiCl_2$ and acetic acid.

Three alkaline solutions are prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions will occur at a neutral pH of about 7.

(4) The acidic and alkaline solutions are combined, and coprecipitation of all of the metal-containing components of the solutions occurs at a pH of about 7, resulting in a slurry.

(5) The palladium-loaded Linde ammonium Y crystalline zeolitic molecular sieve in finely divided form is added to the slurry.

(6) The molecular sieve-containing slurry is filtered to produce a molecular sieve-containing hydrogel filter cake, which is washed repeatedly with dilute ammonium acetate solution, to remove sodium and chloride ionic impurities from both the hydrogel and the molecular sieve contained therein.

(7) The molecular sieve-containing hydrogel is dried in an air-circulating oven and then is activated in flowing air for 5 hours at 950° F.

The finished catalyst is characterized by a surface area of about 400 m.$^2$/g., a pore volume of about 0.4 cc./g., and an average pore diameter of about 40 Angstroms.

Example 2

A cogelled catalyst (Catalyst B is prepared exactly as in Example 1, except that prior to incorporation in the slurry the molecular sieve is not loaded with palladium but is presoaked in an ammoniacal solution of $NiCl_2$, to load the molecular sieve with nickel. The amounts of starting materials are selected to provide a final catalyst containing approximately the same weight percentages of non-palladium components as the catalyst of Example 1.

The catalyst thus differs from the catalyst of Example 1 mainly ii that the nickel contained therein is located both in the gel component and in the molecular sieve component, and palladium is absent.

Example 3

A cogelled catalyst (Catalyst C) is prepared exactly as in Example 1, except that no molecular sieve component is incorporated therein. The amounts of starting materials are selected to provide a final catalyst with the same proportions of non-molecular sieve components as the catalyst of Example 1. The composition of the final catalyst is:

| Component: | Wt. percent of total catalyst |
|---|---|
| NiO | 11.2 |
| $WO_3$ | 27.5 |
| $Al_2O_3$ | 32.6 |
| $SiO_2$ | 28.7 |
| Total | 100.0 |

It will be noted that the weight percentage of each non-molecular sieve component of Catalysts A and B is 89% of the weight percentage of the same component of Catalyst C, the additional 11 weight percent of Catalysts A and B being contributed by the molecular sieve component.

Example 4

Portions of Catalysts A, B and C of Examples 1–3, respectively, are separately used to hydrocrack separate portions of a California gas-oil feedstock, on a once-through basis.

The gas-oil feedstock has the following characteristics:

Boiling range, ° F. _____ 500–900
Gravity, ° API _____ 19
Organic nitrogen content, p.p.m. _____ 3000

The hydrocracking conditions are:

Total pressure, p.s.i.g. _____ 2500.
Total hydrogen rate, s.c.f./bbl. _____ 10,000.
Liquid hourly space velocity, v./v./hr. ___ 0.8.
Per-pass conversion to products boiling below 550° F., vol. percent _____ 60.
Starting temperature, ° F. _____ As indicated below.

The hydrocracking activities of the three catalysts, as measured by the starting temperatures necessary to achieve the indicated per-pass conversion, are:

Catalyst: Starting T, ° F.
A _____ 725
B _____ 750
C _____ 775

The 300°–550° F. jet fuel boiling range product in each case is of the same adequate quality, in that in each case the smoke point is 21 mm. and the freeze point is below −94° F.

The hydrocracked liquid product in each case is essentially free of organic nitrogen compounds, indicating that essentially complete hydrodenitrification accompanies the hydrocracking in each case.

From this example, it appears that: (1) the molecular sieve-containing gel catalysts (Catalysts A and B) have hydrocracking activity superior to that of a catalyst (Catalyst C) that does not contain a molecular sieve component but is otherwise identical; (2) the gel catalyst containing a palladium-loaded molecular sieve component (Catalyst A) has hydrocracking activity superior to that of a gel catalyst that is identical except that contains a molecular sieve component that is nickel-loaded (Catalyst B); and (3) the gel catalyst containing a palladium-loaded molecular sieve component accomplishes essentially complete hydrodenitrification at a substantially lower temperature than Catalysts B and C.

Example 5

Another portion of Catalyst A of Example 1 is used to hydrocrack a solvent-deasphalted hydrocarbon oil boiling above 550° F. and containing 5500 p.p.m. organic nitrogen, on a once-through basis. Thereupon, said portion of Catalyst A is used to hydrocrack another portion of the same solvent-deasphalted oil, with extinction recycle of products boiling above 550° F.

The hydrocracking conditions, after operating equilibrium is reached, are:

| | Catalyst A | |
| --- | --- | --- |
| | Once-through | Recycle |
| Temperature, ° F. | 800 | 800 |
| Total pressure, p.s.i.g. | 2,500 | 2,500 |
| Total exit gas rate | 10,000 | 10,000 |
| Liquid hourly space velocity, v./v./hr. | 0.8 | 0.8 |
| Conversion to 550° F., volume percent | 40 | 75 |
| 300°–550° F. jet fuel product fraction: | | |
| Yield, volume percent | 30.0 | 50.0 |
| Smoke point, mm. | 20 | 30.0 |
| Freeze point, ° F. | −65 | −70 |
| Paraffins, volume percent | 17.0 | 37.0 |
| Naphthenes, volume percent | 68.0 | 54.0 |
| Aromatics, volume percent | 15.0 | 9.0 |

From this example, it appears that a high yield of excellent-quality jet fuel is obtained from the solvent-deasphalted hydrocarbon oil feed, in both once-through and recycle operation. It also appears that the recycle operation results in superior hydrocracking activity, jet fuel yield and jet fuel quality, attributable to cracking into extinction into the jet fuel range of the normal paraffins concentrated in the high-boiling portion of the SDA oil.

Example 6

The 550° F.+product from once-through operation in Example 5 is further processed in a subsequent hydrocracking or catalytic cracking stage. This product is a superior, upgraded feedstock for such subsequent processing.

CONCLUSIONS

Applicant does not intend to be bound by any theory for the unexpectedly superior hydrofining and hydrocracking activity of the catalyst used in the process of the present invention. Applicant assumes that the favorable results are largely attributable to, and unique to, the particular combination of catalytic components used, coupled with the low absolute amount of catalytic metals in the molecular sieve portion of the catalyst.

Although only specific embodiments of the present invention have been described, numerous variations can be made in these embodiments without departing from the spirit of the invention, and all such variations which fall within the scope of the appended claims are intended to be embraced thereby.

What is claimed is:

1. A hydrofining-hydrocracking process which comprises contacting a hydrocarbon feed containing more than 50 parts per million of organic nitrogen and containing substantial amounts of materials boiling above 200° F., said feed being selected from the group consisting of petroleum distillates, solvent-deasphalted petroleum residua, shale oils and coal tar distillates, in a reaction zone with hydrogen and a catalyst, at hydrofining-hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, removing ammonia from the effluent from said reaction zone, and recovering hydrofined and hydrocracked products from said reaction zone, said catalyst comprising:
   (A) A gel matrix comprising:
      (a) at least 15 weight percent silica,
      (b) alumina, in an amount providing an alumina-to-silica weight ratio of 15/85 to 80/20,
      (c) Nickel or cobalt, or the combination thereof, in the form of metal, oxide, sulfide or any combination thereof, in an amount of 1 to 10 weight percent, based on said matrix, calculated as metal,
      (d) Molybdenum or tungsten, or the combination thereof, in an amount of 5 to 25 weight percent, based on said matrix, calculated as metal;
   (B) A crystalline zeolitic molecular sieve:
      (a) containing from 0.1 to 2.0 weight percent palladium, calculated as metal,
      (b) containing less than 5 weight percent sodium,
      (c) being in particulate form and being dispersed throughout said matrix by cogelation of said matrix around said sieve;
said catalyst composite being further characterized by an average pore diameter below 100 Angstroms and a surface area above 200 square meters per gram.

2. A process as in claim 1, wherein a gasoline product and a jet fuel product are recovered from the effluent from said reaction zone.

3. A process as in claim 2, wherein a portion of the effluent from said reaction zone boiling above the gasoline boiling range is hydrocracked in a second reaction zone in the presence of hydrogen and a hydrocracking catalyst at hydrocracking conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, and wherein at least one hydrocracked product is recovered from said reaction zone.

References Cited

UNITED STATES PATENTS

| | | | |
|---|---|---|---|
| 3,132,086 | 5/1964 | Kelley et al. | 208—57 |
| 3,140,253 | 7/1964 | Plank et al. | 208—120 |
| 3,210,267 | 10/1965 | Plank et al. | 208—120 |
| 3,558,475 | 1/1971 | Jaffe | 208—111 |
| 3,132,087 | 5/1964 | Kelley et al. | 208—60 |
| 3,267,022 | 8/1966 | Hansford | 208—111 |
| 3,393,148 | 7/1968 | Bertalacini et al. | 208—264 |
| 3,562,144 | 2/1971 | Child et al. | 208—59 |

DELBERT E. GANTZ, Primary Examiner

G. E. SCHMITKONS, Assistant Examiner

U.S. Cl. X.R.

208—111, 254; 252—455 Z